July 7, 1959 G. E. WATKINS ET AL 2,893,542
GLASS WORKING MACHINE
Filed June 6, 1955 2 Sheets-Sheet 1

INVENTORS
LEANDER N. POND AND
GEORGE E. WATKINS
BY
Clarence R. Patty, Jr.
ATTORNEY

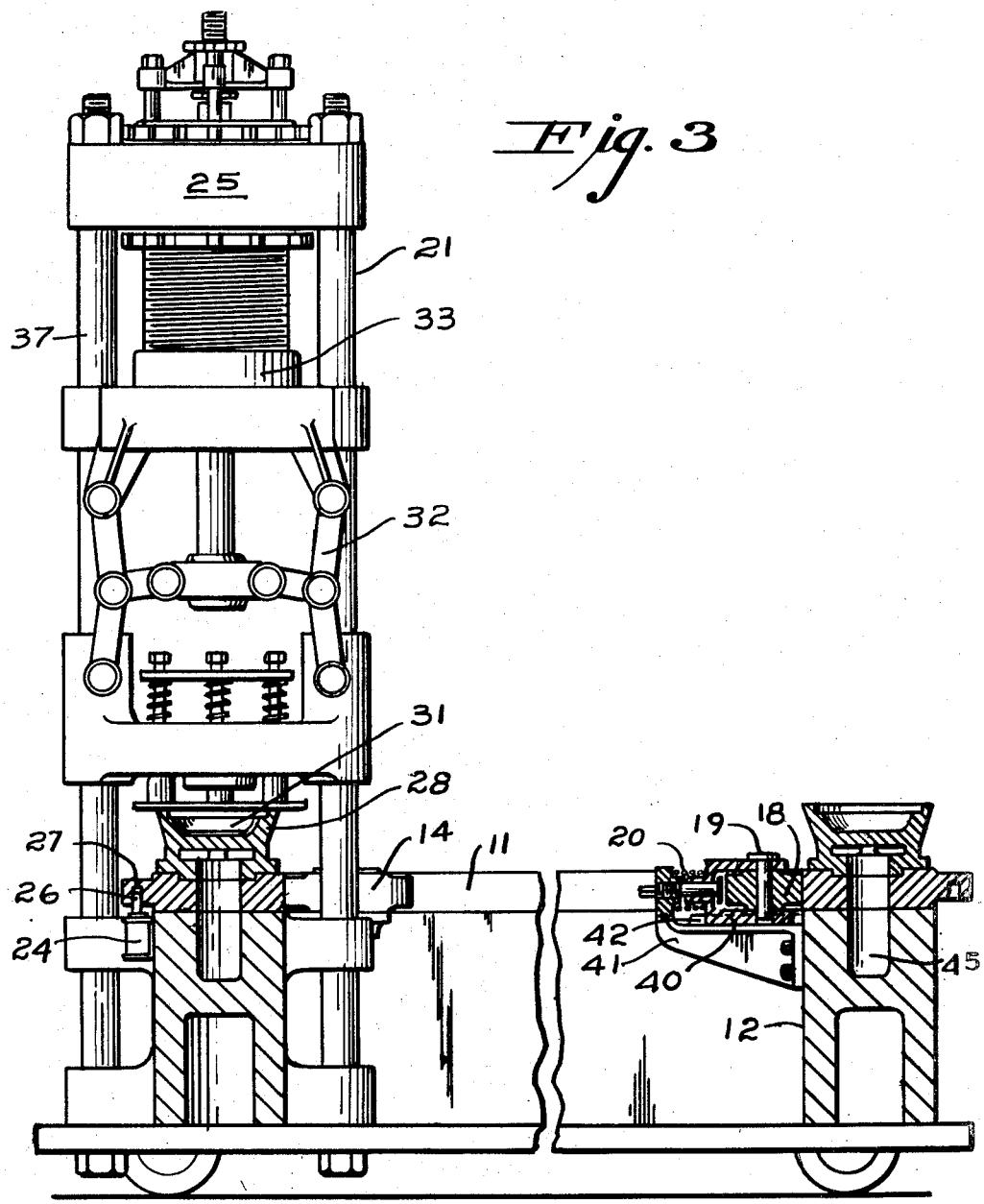

ns Patent Office 2,893,542
Patented July 7, 1959

2,893,542
GLASS WORKING MACHINE

George E. Watkins and Leander N. Pond, Corning, N.Y., assignors to Corning Glass Works, Corning, N.Y., a corporation of New York Application June 6, 1955, Serial No. 513,363

3 Claims. (Cl. 198—209)

The present invention relates to glass working machines and is particularly concerned with the provision of a glass working press wherein substantial radial registry of a pressing plunger, with a mold carried by the turret and indexed under such plunger, is retained in spite of diameter changes of the turret and/or of its support as may result from temperature changes thereof and as may occur with the lapse of time under various operating and surrounding atmospheric conditions.

In the usual turret type of glass working press the turret is ordinarily a circular plate centered about a vertical column passing through its center. In use the temperature of a turret varies considerably, often resulting in excessive warping and also in temporary dimensional changes. When a turret is rigidly anchored at its axial center the diameter of the circular path of travel of the molds carried by its varies with the variation in diameter of the turret; and unless special provisions or adjustments are made compensating for such dimensional changes, all of the molds will be shifted radially, and the one that is at the time indexed under the pressing head or plunger, will be misaligned with respect thereto. Such misalignment often results in the production of inferior or unusable ware.

According to the invention the turret is annular and the transverse cross section from its bore or passage wall to its outer border need be only of a width that will accommodate the molds to be carried by it. In addition, instead of mounting such turret for rotation about a rigidly fixed center, a rigidly fixed path is provided for only the region of the turret traveling under the pressing plunger. Thus the major portion of the turret is permitted to shift laterally in accordance with its transverse dimensional changes without materially shifting the position of that portion of the turret which is under the press head. Moreover, the supporting columns for the press head or plunger are mounted on the support upon which the turret is rotatably arranged and, accordingly, temperature changes such as effect dimensional changes of the support similarly effect the press head columns so that such changes do not noticeably adversely effect alignment. Such a turret, in the absence of a center section, has less tendency to warp, is of materially less mass and, therefore, is less subject to dimensional change than are conventional turrets. Moreover, the power required to start and stop it is less.

The invention can best be described by reference to the accompanying drawing in which:

Fig. 3 is an elevational view, partly in section, along line 3—3 of Fig. 1.

Figure 1:
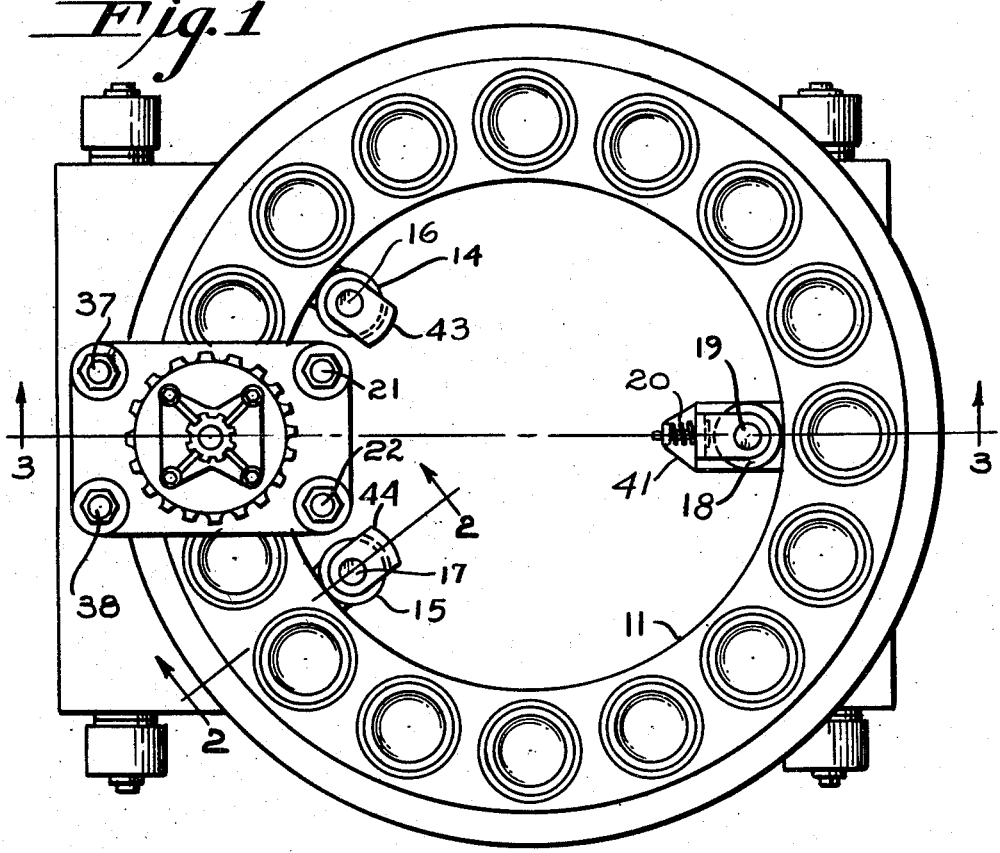
Fig. 1 is a plan view of a glass working press embodying the invention.
Figure 2:
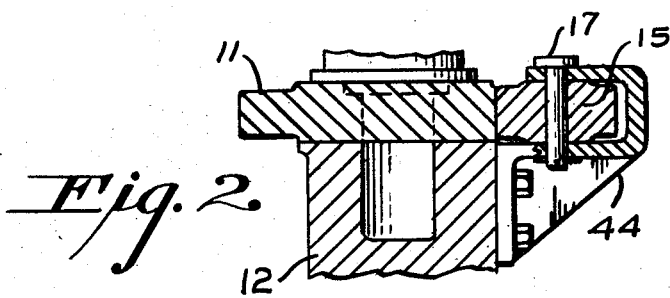
Fig. 2 is an enlarged sectional view of a fragment of the press, taken generally along line 2—2 of Fig. 1.

Referring to the drawing in detail, an annular turret 11 rests on the upper surface of a support or frame 12 which serves as a bearing surface therefor. The turret is rotatably held in its proper position on frame 12 by means of rollers 14 and 15 having fixed axles 16 and 17 respectively, and a spring loaded roller 18 having a movable axle 19. Rollers 14 and 15 are arranged on opposite sides of vertical columns 21 and 22 of a press head assembly 25, and the bore wall of the turret is held tightly against such rollers by the roller 18 under tension of a spring 20 arranged between a carrier 40 and a surface of a carrier supporting bracket 41. As will be noted carrier 40 is slidable on bracket 41 between two guides, such as 42. Brackets 43 and 44 support the axles 16 and 17, respectively. The channel 45 in support 12 affords a convenient way of directing mold cooling air against the mold bottom carried by turret 11.

At the pressing position there may be provided the usual tapered pin 26 adapted to be introduced into a tapered hole 27 in the bottom of turret 11 by means of a pneumatic unit 24 or otherwise, to circumferentially center a mold such as 28, of the row thereof carried by turret 11, with a pressing head or plunger 31 arranged thereover.

The pressing plunger 31 is illustrated as connected to a conventional form of toggle 32 adapted to be operated by a pneumatic unit 33 suitably supported jointly by the columns 21 and 22 from points on the base 12 adjacent the inner peripheral border of the turret and similar columns 37 and 38 adjacent the oppositely disposed outside border thereof. The manner of rotation of turret 11 to successively index molds such as 28 under the pressing head 31 is a matter of choice, and accordingly has not been shown.

What is claimed is:

1. In a conveyor, an annular turret carrying a circular row of glass pressing molds uniformly spaced from one another on its top side, means providing a rotary path of travel for said turret, said means including a support having a horizontal top surface upon which the turret slidably rests in a plane normal to its axis, turret guide means associated with the support within the bore of the turret adjacent its bore wall and located at the respective ends of a relatively short arcuate portion of such top surface over which the turret is arranged, and means associated with the support wholly within the bore of the turret adjacent the center of the remaining arcuate portion of the support surface over which the turret is arranged and constantly urging the relatively short arcuate portion of the turret arranged between said turret guide means into engagement therewith irrespective of changes in diameter of the turret during use, whereby the changes in the path of travel of the turret over the support surface are substantially wholly restricted to that portion of the turret arranged over its remaining relatively large arcuate portion and a pressing mold occupying the arcuate portion of the turret between said guides is maintained the same distance from the center of the support surface irrespective of changes in diameter that occur in such turret during its use.

2. A conveyor such as defined by claim 1 wherein the turret guide means comprises a pair of rollers mounted on fixed axles secured to said support and the last specified means comprises a roller-equipped axle having a carrier slidably secured to said support and provided with a spring for urging the roller against the turret for the purpose set forth.

3. A conveyor such as defined by claim 2 wherein the support is also annular and the respective roller supporting axles are arranged within the bore of the support and the rollers carried thereby are in rolling contact with the bore wall surface of the turret.

References Cited in the file of this patent

UNITED STATES PATENTS

| | | |
|---|---|---|
| 588,795 | Hemingray | Aug. 24, 1897 |
| 774,177 | Hopkins et al. | Nov. 8, 1904 |
| 814,779 | Graham | Mar. 13, 1906 |
| 1,311,578 | Stilson | July 29, 1919 |
| 1,440,639 | Smith | Jan. 2, 1923 |
| 1,450,571 | Allen | Apr. 3, 1923 |
| 1,556,503 | Dunham | Oct. 6, 1925 |
| 1,801,204 | Leuzinger | Apr. 14, 1931 |
| 2,507,441 | Hayes | May 9, 1950 |

FOREIGN PATENTS

| | | |
|---|---|---|
| 519,978 | Great Britain | Apr. 11, 1940 |